United States Patent
Bateman

(10) Patent No.: US 10,400,646 B2
(45) Date of Patent: Sep. 3, 2019

(54) DIESEL EXHAUST FLUID SYSTEM

(71) Applicant: GM GLOBAL TECHNOLOGY OPERATIONS LLC, Detroit, MI (US)

(72) Inventor: Kale Bateman, Scarborough (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 15/701,832

(22) Filed: Sep. 12, 2017

(65) Prior Publication Data

US 2019/0078484 A1  Mar. 14, 2019

(51) Int. Cl.
 *F01N 3/20* (2006.01)

(52) U.S. Cl.
 CPC ........ *F01N 3/2066* (2013.01); *F01N 2610/10* (2013.01); *F01N 2610/1406* (2013.01); *F01N 2610/1433* (2013.01)

(58) Field of Classification Search
 CPC .......... F01N 3/2066; F01N 2610/1433; F01N 2610/1466
 See application file for complete search history.

(56) References Cited

U.S. PATENT DOCUMENTS

2010/0050606 A1* 3/2010 Fulks .............. F01N 3/2066
                                                60/286
2013/0255234 A1* 10/2013 Bauer ............. F01N 3/2066
                                                60/287

* cited by examiner

*Primary Examiner* — Brandon D Lee
(74) *Attorney, Agent, or Firm* — Cantor Colburn LLP

(57) ABSTRACT

A thermal transfer system for a reductant delivery system comprising a reductant storage tank comprising a shell defining an inner tank cavity and a pump assembly disposed in the inner tank cavity. A thermal sink is disposed on or adjacent to an exterior portion of the shell and a thermal conductor extends from the thermal sink, through the shell, to terminate at a location closely adjacent to the pump assembly. The thermal conductor operates to transfer thermal energy from a location adjacent to the pump assembly to the thermal sink, to thereby induce accelerated freezing of the reductant.

14 Claims, 4 Drawing Sheets

DIESEL EXHAUST FLUID SYSTEM

INTRODUCTION

The present disclosure relates to a vehicle having a delivery system for Diesel Exhaust Fluid ("reductant") and, more particularly, to a reductant supply source and system for relieving pressure upon freezing of the reductant and rapidly thawing the fluid during operation of the vehicle.

Diesel engines are preferred for many heavy duty vehicle applications such as long-haul trucking, for instance, due to performance characteristics inherent in the Diesel cycle upon which they are based. Such performance comes at the cost of an increase in certain regulated exhaust constituents. One class of exhaust constituents that must be controlled are oxides of Nitrogen ("NOx") and, one way of doing so in automotive applications is through the use of a Selective Catalytic Reduction ("SCR") device that is disposed in the engine exhaust system. A typical SCR device utilizes a catalyst coated substrate that utilizes a reductant, injected into the diesel engine exhaust gas at a location upstream thereof, to reduce NOx constituents. The reductant mixes with the exhaust gas and reacts with the catalyst on the substrate, in a known manner.

Automotive applications that employ SCR devices may carry a reductant delivery system including a reductant storage tank that is fluidically connected, via a supply system, to the engine exhaust system. A challenge in the design of the reductant storage tank and supporting systems is that the fluid, which comprises a large percentage of water, tends to freeze at temperatures below −11 degrees centigrade which is well above the minimum operating temperatures of most vehicles. Freeze propagation of the reductant in the reductant storage tank may move from the outside surfaces of the tank inwardly towards a fluid pump assembly that is disposed therein. Aided in part by the thermal mass of the fluid pump assembly, the final fluid portion of the reductant may reside above or adjacent-to the pump assembly. As the final fluid portion freezes, the reductant experiences an expansion rate of about 10%, resulting in the application of significant forces on the pump assembly. Damage may result. It is desirable to avoid exertion of such freeze forces on the reductant pump assembly and, in addition, to speed the thawing of reductant fluid adjacent to the pump assembly when operation of the diesel engine is resumed following a reductant tank freeze.

SUMMARY

In an exemplary embodiment a thermal transfer system for a reductant delivery system comprises a reductant storage tank comprising a shell defining an inner tank cavity. A pump assembly is disposed in the inner tank cavity and a thermal sink is disposed on, or adjacent to, an exterior portion of the shell. A thermal conductor extends from the thermal sink, through the shell, to terminate at a location closely adjacent to the pump assembly. The thermal conductor is operable to transfer thermal energy from a location adjacent to the pump assembly to the thermal sink to thereby induce accelerated freezing of the reductant.

In one or more examples of the thermal transfer system, the thermal sink is fixedly attached to the tank shell.

In one or more examples of the thermal transfer system, the thermal sink comprises a vehicle structure.

In one or more examples of the thermal transfer system, the thermal conductor comprises a thermally conductive rod having a first end located adjacent to the pump assembly and a second end in thermal communication with the thermal sink.

In one or more examples of the thermal transfer system the thermally conductive rod comprises a heat pipe.

In one or more examples of the thermal transfer system, the operation of the system locates a final fluid portion, within the inner tank cavity, to prevent the application of freezing forces on the pump assembly.

In one or more examples of the thermal transfer system, the thermal transfer system comprises more than one thermal conduit.

In one or more examples of the thermal transfer system, the system comprises a conduit sleeve extending from the shell of the reductant storage tank to terminate at a location closely adjacent to the pump assembly. An axially extending opening extends the length of the conduit sleeve, having a fluidically sealed end. The opening receives the thermally conductive rod therein to position the first end adjacent to the pump assembly and out of chemical communication with the reductant, and the second end in thermal communication with the thermal sink.

In one or more examples of the thermal transfer system, the wall of the sleeve has a varying thickness to modify the rate of thermal transfer to the thermally conductive rod along a length thereof.

In one or more examples of the thermal transfer system, the conduit sleeve is integral with the shell of the reductant storage tank.

In one or more examples of the thermal transfer system, the thermal sink comprises a flanged base supporting the pump assembly and the thermal sink comprises thermally conductive portions of the pump assembly.

In one or more examples of the thermal transfer system, the thermally conductive portions of the pump assembly comprise a pump bucket.

In one or more examples of the thermal transfer system, the thermal conductor is operable to transfer thermal energy from the thermal sink to a location adjacent to the pump assembly to thereby induce accelerated thawing of the reductant.

In another exemplary embodiment, an exhaust gas treatment system of an internal combustion engine, comprises an exhaust gas conduit, a Selective Catalytic Reduction ("SCR") device and a reductant delivery system. The reductant delivery system comprises a reductant storage tank, a pump assembly disposed in the reductant storage tank and a thermal transfer system. The thermal transfer system comprises a thermal sink disposed on or adjacent to an exterior portion of the shell and a thermal conductor extending from the thermal sink, through the shell, to terminate at a location closely adjacent to the pump assembly. The thermal conductor is operable to transfer thermal energy from a location adjacent to the pump assembly to the thermal sink to thereby induce accelerated freezing of the reductant.

In one or more examples of the exhaust gas treatment system, the thermal conductor comprises a thermally conductive rod having a first end located adjacent to the pump assembly and a second end in thermal communication with the thermal sink.

In one or more examples of the exhaust gas treatment system, the thermally conductive rod is a heat pipe.

In one or more examples of the exhaust gas treatment system, the operation of the system locates a final fluid portion, within the inner tank cavity, to prevent the application of freezing forces on the pump assembly.

In one or more examples of the exhaust gas treatment system, the thermal transfer system comprises more than one thermal conduit.

In one or more examples of the exhaust gas treatment system, a conduit sleeve extends from the shell of the reductant storage tank to terminate at a location closely adjacent to the pump assembly and an axially extending opening extends the length of the conduit sleeve having a fluidically sealed end. The opening receives the thermally conductive rod therein to position the first end adjacent to the pump assembly and out of chemical communication with the reductant, and the second end in thermal communication with the thermal sink.

In one or more examples of the exhaust gas treatment system, the thermal sink comprises a flanged base supporting the pump assembly and the thermal sink comprises thermally conductive portions of the pump assembly.

In one or more examples of the exhaust gas treatment system, the thermally conductive portions of the pump assembly comprise a pump bucket.

In one or more examples of the exhaust gas treatment system, the thermal conductor operates to transfer thermal energy from the thermal sink to a location adjacent to the pump assembly to thereby induce accelerated thawing of the reductant.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
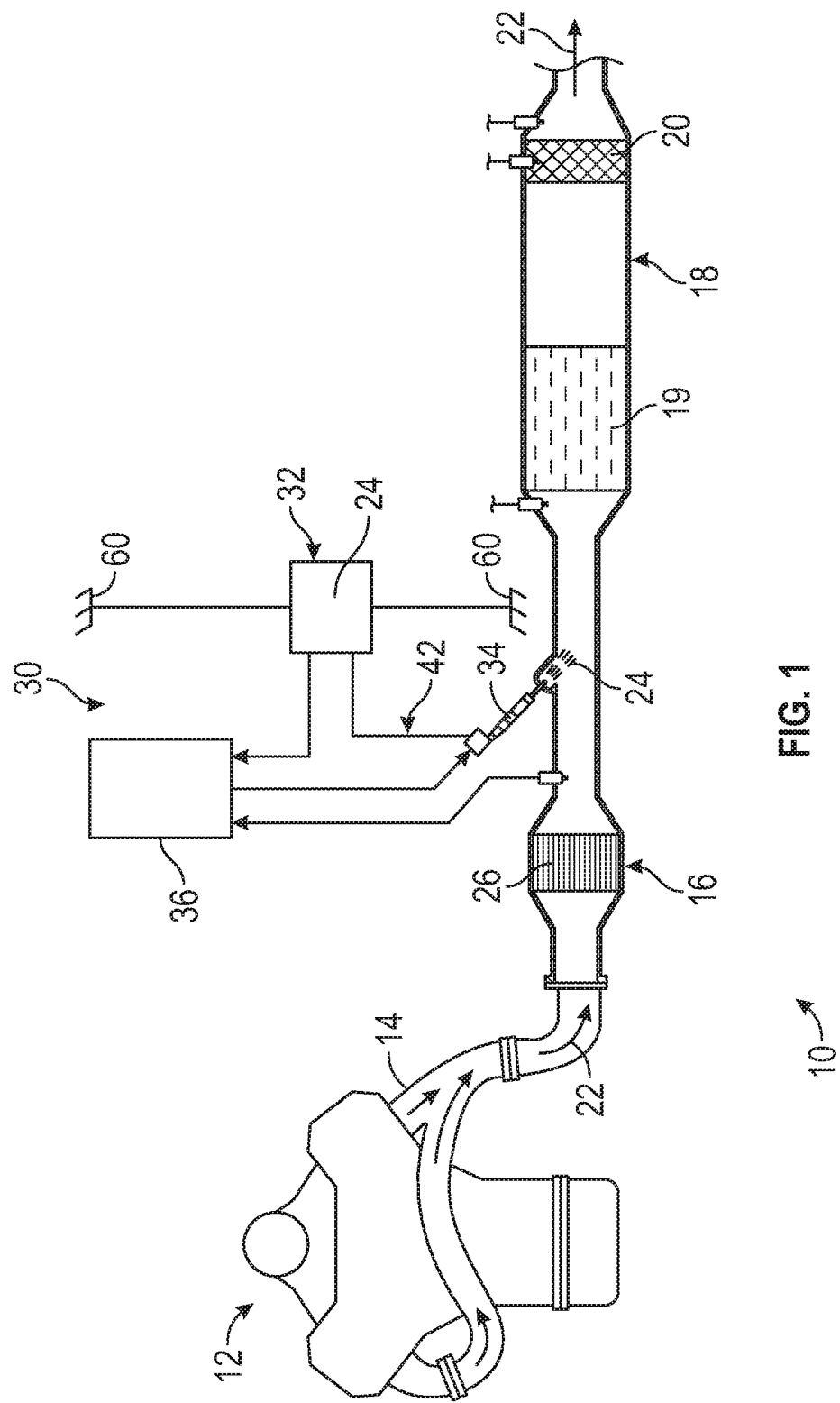
FIG. 1 is a schematic view of an exhaust system for an internal combustion engine incorporating features of the disclosure.

The following description is merely exemplary in nature and is not intended to limit the present disclosure, its application or uses. It should be understood that throughout the drawings, corresponding reference numerals indicate like or corresponding parts or features.

Referring to FIG. 1, an exemplary embodiment is directed to an exhaust gas treatment system 10 for the reduction of regulated exhaust gas constituents emitted by an internal combustion engine 12. The exhaust gas treatment system 10 described herein can be implemented in various engine systems which may include, for example, diesel engine systems and gasoline engine systems.

The exhaust gas treatment system 10 generally includes an exhaust gas conduit 14 and one or more exhaust treatment devices. The exhaust treatment devices may include, but are not limited to, an Oxidation Catalyst ("OC") device 16, and a Selective Catalytic Reduction ("SCR") device 18. The SCR device may include both a SCR catalyst 19 and a particulate filter ("PF") 20. The PF 20 may be integrated with the SCR catalyst 19 to form the SCR device, as illustrated in the Figure. As can be appreciated, the exhaust system 10 of the present disclosure may include various combinations of one or more of the exhaust treatment devices and/or other exhaust treatment devices (not shown) and is not limited to the example illustrated.

The exhaust gas conduit 14, which may comprise several segments, transports exhaust gas 22 from the engine 12 to the various exhaust treatment devices 16, 18 of the exhaust gas treatment system 10. As can be appreciated, the OC 16 can be one of various flow-through, oxidation catalyst devices known in the art. In various embodiments the OC 16 may include a flow-through metal or ceramic monolith substrate 26 that includes an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC device 16 is useful in treating unburned gaseous and non-volatile HC and CO, which are oxidized to form carbon dioxide and water.

The SCR device 18 may be disposed downstream of the OC device 16, and is configured to reduce NOx constituents in the exhaust gas 22. The SCR device 18 includes an SCR catalyst composition (e.g., a washcoat) and may utilize a reductant 24 to reduce the NOx. The reductant 24 may include, but is not limited to, ammonia ($NH_3$), and urea ($CO(NH_2)_2$). The SCR catalyst composition may contain a zeolite and one or more base metal components such as iron (Fe), cobalt (Co), copper (Cu) or vanadium (V) which can operate efficiently to convert NOx constituents in the exhaust gas 22 into acceptable by-products (e.g., diatomic nitrogen ($N_2$) and water ($H_2O$)) in the presence of $NH_3$. The reductant 24 utilized by the SCR device 18 may be in the form of a liquid (an aqueous urea solution) which is discussed in greater detail herein.

Figure 2A:
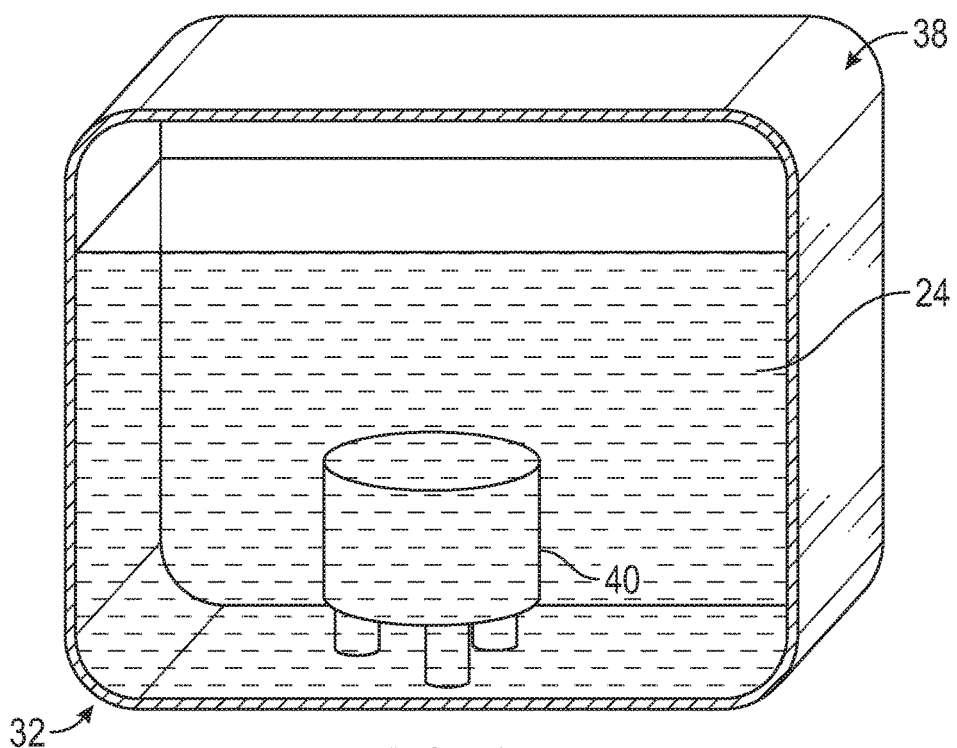
FIGS. 2A, 2B, and 2C are schematic illustrations of a reductant delivery system of the exhaust system of FIG. 1, undergoing a reductant freezing sequence.
Figure 2B:
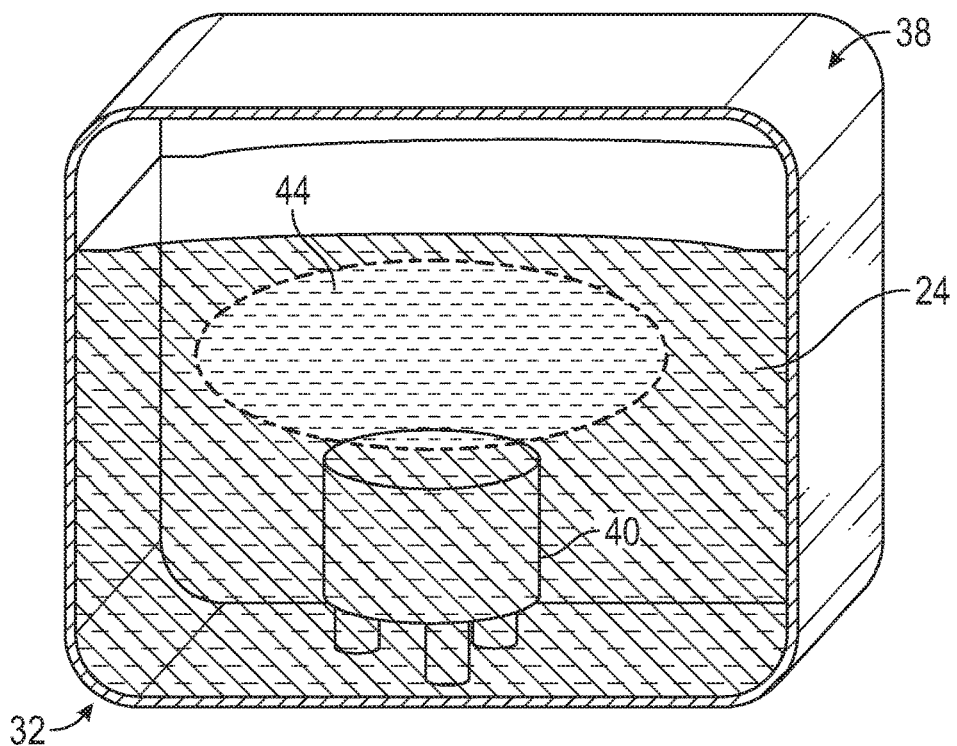
Figure 2C:
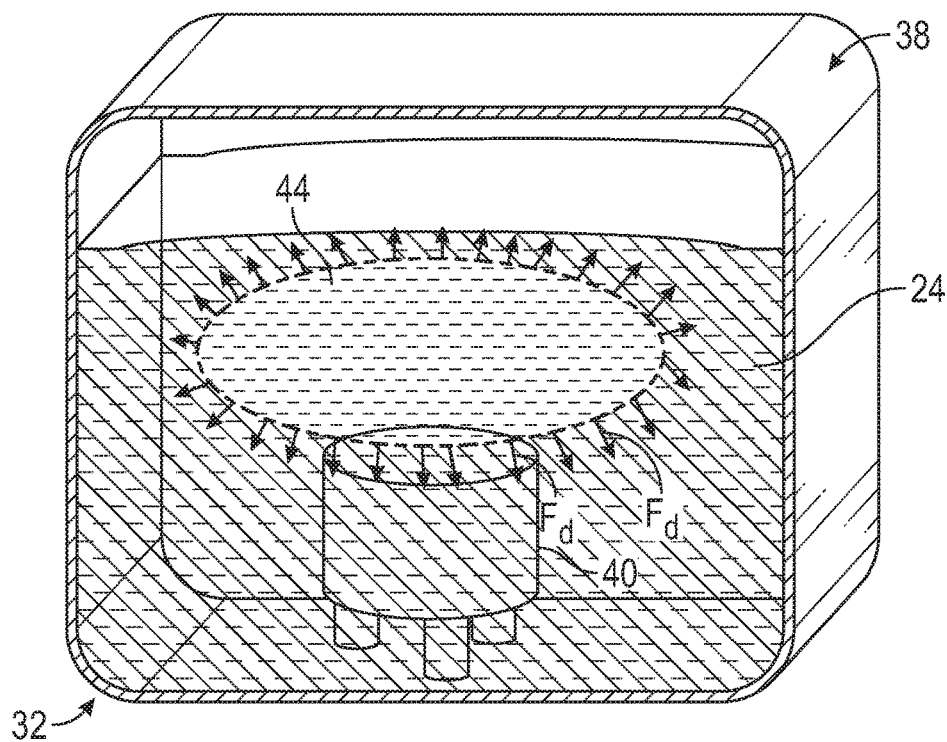

The exhaust gas treatment system 10 illustrated in FIG. 1 further includes a reductant delivery system 30 that introduces the reductant 24 to the exhaust gas 22. The reductant delivery system 30 includes a reductant supply source 32, an injector 34, and a control module 36. The reductant supply source 32 stores the reductant 24 and is in fluid communication with the injector 34. The reductant 24 may include, but is not limited to, NH3, urea and water. In accordance with an exemplary embodiment, FIGS. 2A-2C illustrate a portion of the reductant delivery system 30 experiencing a freezing sequence of the reductant 24. The reductant delivery system 30 includes a reductant storage tank 38 having a pump assembly 40 disposed therein. Reductant 24 may be fluidly connected, via a supply system 42, FIG. 1, to the exhaust system 10 of the vehicle (not shown). A challenge of some reductant delivery systems occurs around −11 degrees centigrade (−11° C.), where reductant 24 tends to freeze. −11° C. is above the minimum operable temperature of the vehicle. Reductant 24 in reductant storage tank 38 may freeze based on various factors. For example, the pump assembly 40 (as a thermal mass) may take longer to cool than surrounding reductant 24, and may therefore cause reductant proximate to the pump assembly 40 to freeze last. As shown in FIG. 2B, reductant 24 tends to freeze from the exterior of storage tank 38 to the interior thereof. The outside-in freezing pattern may result in a final fluid portion 44 residing above, or closely adjacent to, the pump assembly 40. As depicted in FIG. 2C, as the final fluid portion 44 freezes, reductant 24 can experience an expansion rate of about 10%, which can result in the application of significant forces $F_d$ on pump assembly 40.

Figure 3:
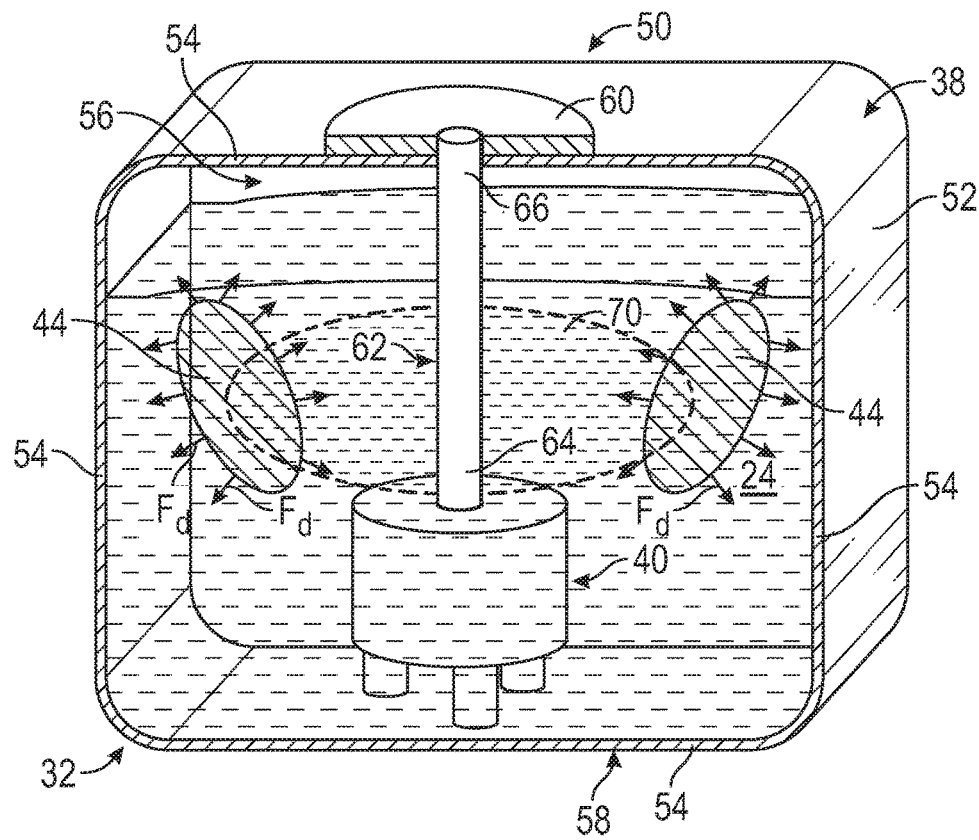
FIG. 3 is a schematic illustration of a reductant delivery system embodying a thermal transfer system.

Referring now to FIG. 3, a thermal transfer system 50 may be utilized, in conjunction with the reductant storage tank 38 of the reductant delivery system 30, to modify the reductant freezing sequence described, thereby relocating the final fluid portion 44 from locations adjacent to the pump assembly 40. Relocation of the final fluid portion 44 from adjacent to the pump assembly 40 will prevent the application of forces Fd, on the pump thereby preventing damage during the freezing of the reductant 24. In an embodiment, the reductant storage tank 38 comprises a shell 52 defined by walls 54. The shell 32 defines an inner tank cavity 56 in which the pump assembly 40 and reductant 24 is stored. The pump assembly 40 may be installed in the reductant storage tank 38 through an opening (not shown) in a wall 54 in a known manner. In the embodiment illustrated in FIG. 3 the pump assembly 40 rests adjacent to a bottom portion 58 of the reductant storage tank 38. Disposed on or adjacent to an exterior portion of the shell 52 of the reductant storage tank 38 is a thermal sink 60.

In the embodiment illustrated, the thermal sink 60 is fixedly attached to the tank shell 52. However, the thermal sink 60 may be any vehicle structure capable of acting as such (ex. vehicle frame). Extending from the thermal sink 60, through the shell 52 to terminate at a location closely adjacent to the pump assembly is a thermal conduit 62. The thermal conduit 62 may comprise a heat pipe that is configured to transfer heat (thermal energy) from a first end 64 to a second end 66 and to the thermal sink 60. The thermal conduit 62 may comprise a thermally conductive rod, such as an aluminum rod, or a specialized heat pipe known in the art. By locating the first end 64 of the thermal conduit in a region 70 of the inner tank cavity 56 at which the final fluid portion 44 of the reductant 24 typically freezes, heat may be transferred therefrom to induce accelerated freezing of the reductant 24. The result of such rapid reductant freezing is to relocate the final fluid portion 44 to a location or locations within the inner tank cavity 56 where forces Fd will not affect the pump assembly 40. It should be clear that more than one thermal conduit 62 may be utilized to achieve the desired freeze results and that one conduit is shown in FIG. 3 for the purpose of simplifying the teachings of this disclosure.

Figure 4:
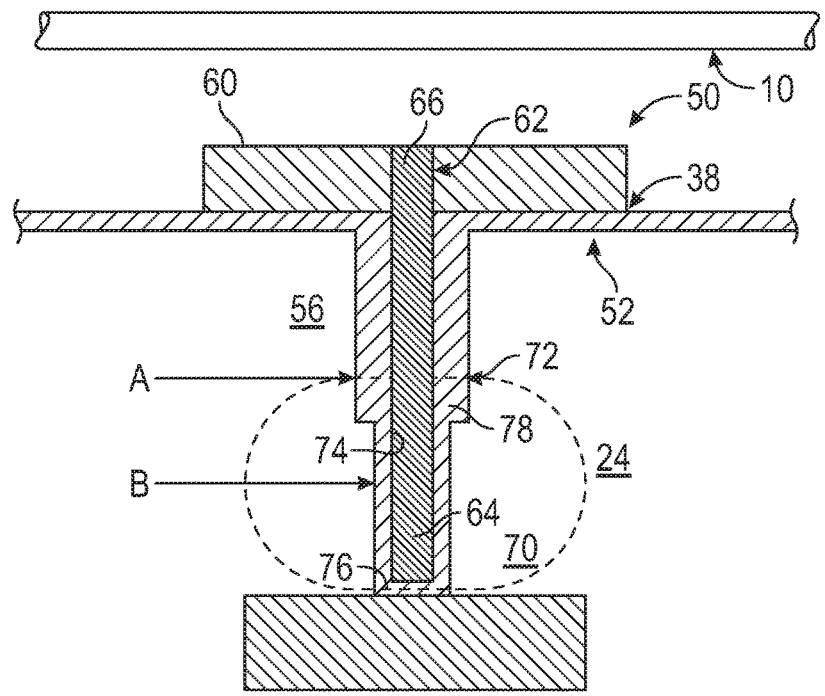
FIG. 4 is a schematic illustration of portions of the thermal transfer system of the disclosure.

Referring now to FIG. 4, in an embodiment it may be desirable to isolate the thermal conduit 62 from the corrosive effects of the reductant 24. In such a case, a conduit sleeve 72 may extend from the shell 52 of the reductant storage tank 38, terminating in the region 70 of the inner tank cavity 56. The conduit sleeve 72 defines an axially extending opening 74 extending the length thereof and is sealed at an end 76 thereby isolating the opening from the reductant contained within the inner tank cavity 56. The opening 74 receives the thermal conduit 62 therein allowing the first end 64 to be located in region 70 and the second end 66 to be in thermal communication with thermal sink 60; avoiding chemical interaction with reductant 24. In an embodiment, the sleeve wall 78 may be of varying thickness (A>B) to modify the rate of thermal transfer to the thermal conduit 62 along the length thereof. As illustrated in FIG. 4, the conduit sleeve 72 may be integral with the shell 52 of the reductant storage tank 38. Such an integral feature may be formed during the molding of the tank 38. Additionally it is contemplated that the conduit sleeve 72 may be inserted through an opening (not shown) in a wall 54 of the reductant tank 38. In such instances a fluid seal (not shown) will be established about the opening.

It should be apparent to those skilled in the art that, while the thermal transfer system 50 has been illustrated thus far for localized removal of thermal energy from the reductant 24 stored in the inner tank cavity 56 of the reductant storage tank, its operation may be reversed in order to accelerate the melting of frozen reductant in the tank. The acceleration of reductant melting is desirable in order to return the exhaust gas treatment system 10 to a liquid state. In an embodiment, illustrated in FIGS. 1 and 3, a heat source such as exhaust gas treatment system 10 may be located such that thermal energy radiated therefrom is absorbed by thermal sink 60. As the thermal sink 60 absorbs thermal energy (heat) from the exhaust treatment system 10 it is conducted along the thermal conduit 62 from the second end 66 to the first end 64 where it is heat rejected into the reductant 24 thereby heating the reductant in the region 70 of the inner tank cavity 56. Upon shut down of the internal combustion engine 12, the exhaust gas treatment system 10 will rapidly cool causing the thermal cycle to reverse and draw thermal energy from region 70.

Figure 5:
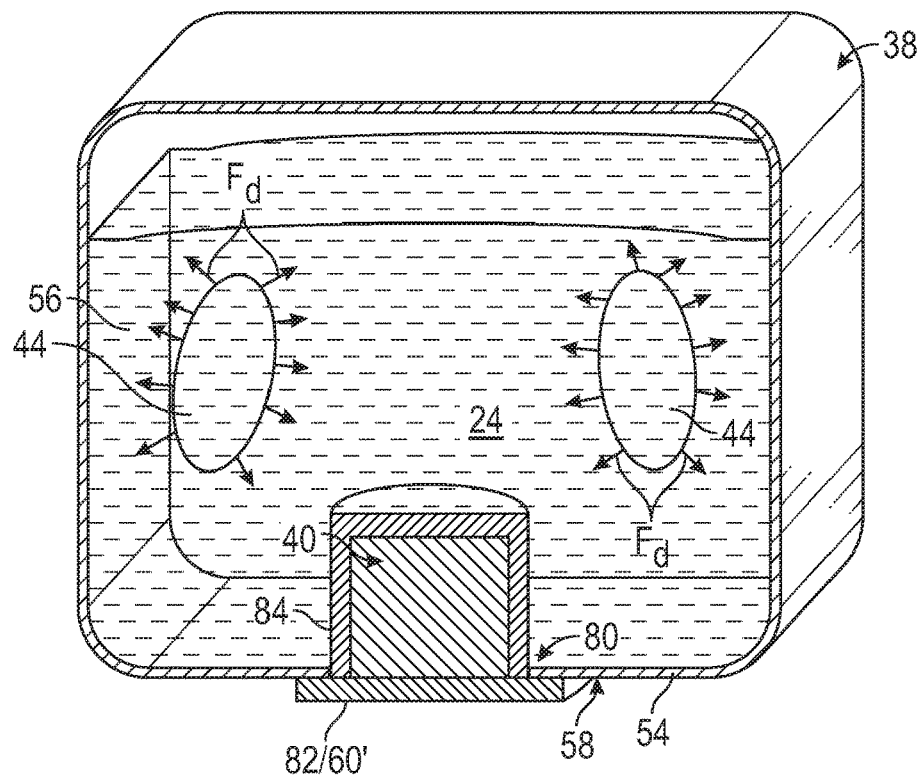
FIG. 5 is a schematic illustration of another embodiment of a reductant delivery system embodying a thermal transfer system.

Referring now to FIG. 5, in another embodiment, the pump assembly 40 may be inserted through a tank opening 80 in the bottom 58 of the reductant storage tank 38. The pump assembly 40 may be mounted on a flanged base 82 that is operable to sealingly close the opening 80 upon insertion of the pump assembly 40 into the tank 32. In addition, the flanged base 82 may comprise, or be in communication with, a thermal sink 60'. The thermal sink 60' is in thermal communication with thermally conductive portions of the pump assembly 40 such as pump bucket 84. The pump bucket 84 is constructed of thermally conductive material, such as aluminum, and extends about the periphery of the pump assembly 40 to support the pump assembly 40 in the inner tank cavity 56. In operation, heat may be transferred from reductant 24, surrounding the pump assembly 40, to the flanged base 82 inducing accelerated freezing of the reductant surrounding the pump assembly. The result of such rapid reductant freezing is to relocate the final fluid portion 44 to a location, or locations, within the inner tank cavity 56 where forces Fd will not affect the pump assembly 40. As indicated, a heat source such as exhaust gas treatment system 10, located near the flanged base will have the effect of reversing the process of the thermal transfer system 50 in order to accelerate the melting of frozen reductant 24 in reductant storage tank 38. The acceleration of reductant melting is desirable in order to return the exhaust gas treatment system 10 to full operation during cold operating conditions.

While the disclosure has been described with reference to exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the essential scope thereof. Therefore, it is intended that the disclosure not be limited to the particular embodiments described, but that it will include all embodiments falling within the scope of the application.

What is claimed is:

1. A thermal transfer system for a reductant delivery system comprising:
   a reductant storage tank comprising a shell defining an inner tank cavity having reductant therein;

a pump assembly disposed in the inner tank cavity;
a thermal sink disposed on, or adjacent to, an exterior portion of the shell at a location of the shell opposite the pump assembly, the thermal sink being a thermally conductive solid member operable for absorbing heat; and
a thermal conductor extending from the thermal sink, through the shell, to terminate at a location adjacent to the pump assembly, the thermal conductor including a thermally conductive solid axial rod having a first end located adjacent to the pump assembly in a region of the inner tank cavity at which reductant typically freezes last to form a final freezing fluid portion and a second end in thermal connection with the thermal sink, the thermal conductor operable to transfer thermal energy away from a location adjacent to the pump assembly and to the thermal sink, thereby inducing accelerated freezing of the reductant near the pump assembly whereby a typical position of the final freezing fluid portion of the reductant is relocated in the inner tank cavity to a position farther away from the pump assembly.

2. The thermal transfer system of claim 1, wherein the thermal sink is fixedly attached to the tank shell.

3. The thermal transfer system of claim 1, the thermal sink comprising a vehicle structure.

4. The thermal transfer system of claim 1, further comprising:
a conduit sleeve extending from the shell of the reductant storage tank to terminate at a location closely adjacent to the pump assembly; and
an axially extending opening extending the length of the conduit sleeve and having a fluidically sealed end;
wherein, the opening receives the thermally conductive rod therein to allow the first end to be located adjacent to the reductant pump and out of chemical communication with the reductant, and the second end to be in thermal communication with the thermal sink.

5. The thermal transfer system of claim 4, a wall of the sleeve having a varying thickness to modify the rate of thermal transfer to the thermally conductive rod along a length thereof.

6. The thermal transfer system of claim 4, wherein the conduit sleeve is integral with the shell of the reductant storage tank.

7. An exhaust gas treatment system of an internal combustion engine, comprising:
an exhaust gas conduit;
a Selective Catalytic Reduction device;
a reductant delivery system comprising:
a reductant storage tank comprising a shell defining an inner tank cavity;
a pump assembly disposed in the reductant storage tank; and
a thermal transfer system comprising:
a thermal sink disposed on, or adjacent to, an exterior portion of the shell; and
a thermal conductor extending from the thermal sink, through the shell, to terminate at a location adjacent to the pump assembly, the thermal conductor operable to transfer thermal energy from a location adjacent to the pump assembly to the thermal sink to thereby induce accelerated freezing of the reductant;
a conduit sleeve surrounding the thermal conductor and extending from the shell of the reductant storage tank to terminate at a location closely adjacent to the pump assembly; and
a wall of the conduit sleeve having a varying thickness to modify the rate of thermal transfer along a length thereof.

8. The exhaust gas treatment system of claim 7, the thermal conductor comprising a thermally conductive rod having a first end located adjacent to the pump assembly and a second end in thermal communication with the thermal sink.

9. The exhaust gas treatment system of claim 8, wherein the thermally conductive rod is a heat pipe.

10. The exhaust gas treatment system of claim 8, further comprising:
an axially extending opening extending the length of the conduit sleeve and the conduit sleeve having a fluidically sealed end;
wherein, the opening receives the thermally conductive rod therein to allow the first end to be located adjacent to the reductant pump and out of chemical communication with the reductant, and the second end to be in thermal communication with the thermal sink.

11. The exhaust gas treatment system of claim 7, the thermal sink comprising a flanged base supporting the pump assembly and the thermal sink comprising thermally conductive portions of the pump assembly.

12. The exhaust gas treatment system of claim 11, the thermally conductive portions of the pump assembly comprising a pump bucket.

13. The exhaust gas treatment system of claim 7, the thermal conductor operable to transfer thermal energy from the thermal sink to a location adjacent to the pump assembly to thereby induce accelerated thawing of the reductant.

14. A thermal transfer system for a reductant delivery system comprising:
a reductant storage tank comprising a shell defining an inner tank cavity;
a pump assembly disposed in the inner tank cavity;
a thermal sink disposed on, or adjacent to, an exterior portion of the shell; and
a thermal conductor extending from the thermal sink, through the shell, to terminate at a location adjacent to the pump assembly, the thermal conductor operable to transfer thermal energy from a location adjacent to the pump assembly and to the thermal sink thereby inducing accelerated freezing of the reductant, the thermal conductor having a thermally conductive rod having a first end located adjacent to the pump assembly and a second end in thermal communication with the thermal sink;
a conduit sleeve extending from the shell of the reductant storage tank to terminate at a location closely adjacent to the pump assembly, a wall of the sleeve having a varying thickness to modify the rate of thermal transfer to the thermally conductive rod along a length thereof; and
an axially extending opening extending the length of the conduit sleeve and having a fluidically sealed end;
wherein, the opening receives the thermally conductive rod therein to allow the first end to be located adjacent to the reductant pump and out of chemical communication with the reductant, and the second end to be in thermal communication with the thermal sink.

* * * * *